July 28, 1931.  E. GRASSOT  1,816,772
RELAY
Original Filed Aug. 13, 1926
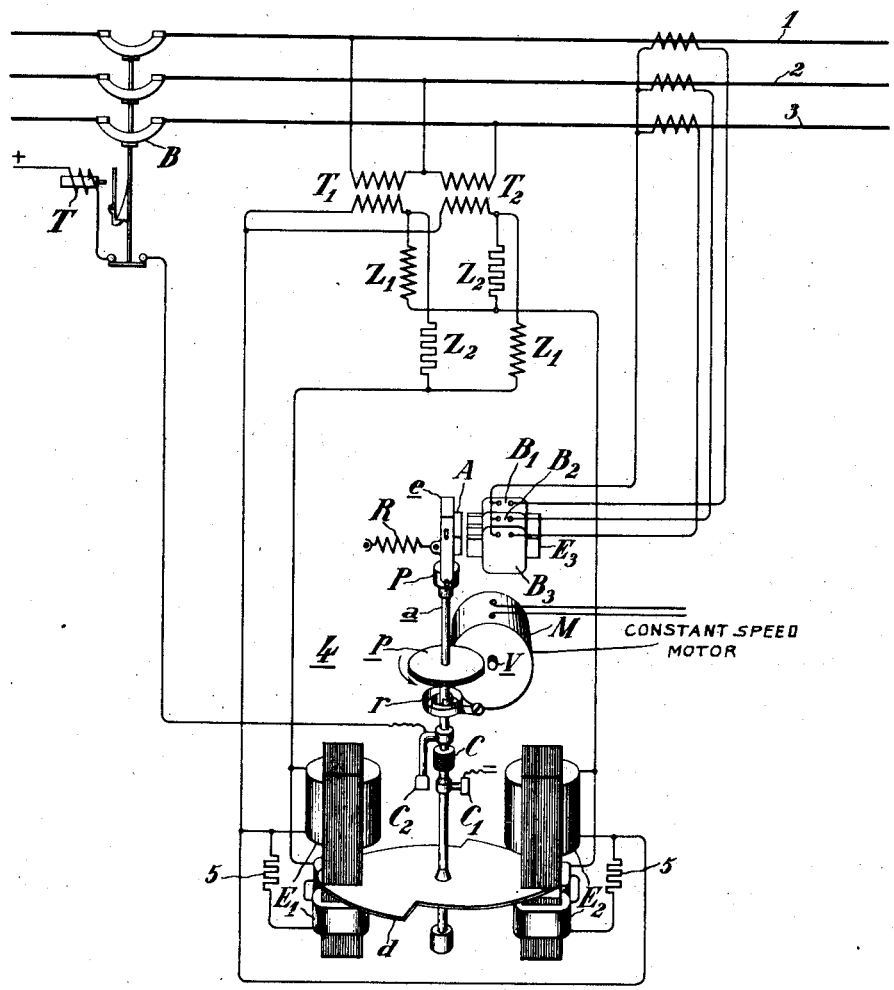
Inventor:
Emile Grassot,
by Charles E. Tullar
His Attorney.

Patented July 28, 1931

1,816,772

UNITED STATES PATENT OFFICE

EMILE GRASSOT, OF MEUDON, FRANCE, ASSIGNOR TO GENERAL ELECTRIC COMPANY, A CORPORATION OF NEW YORK

RELAY

Original application filed August 13, 1926, Serial No. 129,031, and in France September 19, 1925. Divided and this application filed July 1, 1929. Serial No. 375,299.

My invention relates to improvements in relays and more particularly protective relays responsive to unbalanced circuit conditions and an object of my invention is to provide improved relay apparatus whereby to obtain on the occurrence of unbalanced circuit conditions a selective timing action dependent on a predetermined function of the phase sequence components of an electric quantity of a circuit.

This application is a division of my application, Serial No. 129,031, filed August 13, 1926, for selective relays responsive to unbalanced electric quantities.

My invention will be better understood from the following description when considered in connection with the accompanying drawing and its scope will be pointed out in the appended claims.

In the single figure of the accompanying drawing, a polyphase electric circuit 1, 2, 3 is arranged to be controlled by a circuit interrupter B having a trip coil T under the control of a selective relay 4 embodying my invention. In accordance with my invention, I provide an arrangement for obtaining a retardation or time action proportional to the quotient of two functions by making use of a movable constant speed equipment and varying the travel that this equipment must make, before effecting a control contact, proportionally to the quotient of the two functions under consideration. As shown, the release retardation of the relay 4 is proportional to a predetermined function of at least two of the phase sequence components of an electric quantity of the circuit 1, 2, 3. This function is $$\frac{U_d^2 - U_i^2}{U_d^2},$$

$U_d$ and $U_i$ being respectively the positive and negative phase sequence components of a voltage of the circuit 1, 2, 3.

In order to obtain operation according to this function, the relay 4 may include a movable member such as an induction disk $d$ which is arranged to be actuated by two motoring elements such as electromagnets $E_1$, $E_2$ respectively connected to be energized in accordance with the positive and negative phase sequence components of a voltage of the circuit 1, 2, 3. The positive and negative phase sequence components $U_d$ and $U_i$ respectively may be obtained in various ways, examples of which are well known to the art. In the arrangement illustrated $Z_1$ and $Z_2$ are impedances which may be equal in absolute value but of such a character that $Z_1$ produces a phase displacement 60° greater than that produced by $Z_2$. The network involving the impedances $Z_1$ and $Z_2$ may be energized from the circuit 1, 2, 3 through suitable means such as potential transformers $T_1$, $T_2$. The motoring elements $E_1$ and $E_2$, as shown, are of the wattmetric type and suitable phase displacing means 5 may be connected in series with one of the coils of these elements. These motoring elements act in opposite directions on the disk $d$, the material of which is so distributed by cutting or shaping the disk and positioning it relatively to the poles of the electromagnets that the disk takes up a position of equilibrium depending only on the ratio $$\frac{U_i}{U_d}.$$

$\alpha$ the angle of deflection of the disk is, therefore, proportional to a function of the ratio of the negative and positive phase sequence components of the voltage so that if $K$ is a constant it follows that:

$$\alpha = K\frac{U_i^2}{U_d^2}$$

If $\alpha_0 = K$ is the maximum deflection and if the angles are measured from this maximum deflection it follows that:

$$\beta = K - K\frac{U_i^2}{U_d^2} = K\left(\frac{U_d^2 - U_i^2}{U_d^2}\right).$$

A contact member $C_1$ is mounted on the spindle of the disk D which may be retarded by drag magnets, not shown in the drawing. Cooperating with this contact is another movable contact $C_2$ which is arranged to be driven by a constant speed movable equipment including a spindle $a$ pivoted at its lower extremity in a step bearing C which may also serve as an upper bearing for the spindle of the disk D. The spindle $a$ is mounted at its upper end in a bearing P. In order that the spindle $a$ and its associated contact $C_2$ may be normally at rest and yet actuated on the occurrence of abnormal circuit conditions, it may be engaged by the constant speed driving mechanism in response to an abnormal circuit condition. For this purpose the bearing P may be pivotally mounted in a stirrup $e$ secured to a magnetic armature A and acted on by a spring R. For driving the spindle $a$, any suitable constant speed means such as a motor M may be arranged to engage by means of the tangent screw or worm $v$ with a toothed pinion or worm gear $p$ secured to the spindle $a$. The armature A may form a part of any suitable electromagnetic means responsive to abnormal conditions on the circuit 1, 2, 3. The electromagnet $E_3$, as shown, includes windings $B_1$, $B_2$, $B_3$ respectively connected to be energized in accordance with the currents in the circuit conductors 1, 2 and 3. The movement of the spindle $a$ may be opposed by a biasing or return spring $r$.

Under normal circuit conditions, the currents in the windings $B_1$, $B_2$, $B_3$ of the electromagnets $E_3$ are not sufficient to attract the armature A. Consequently, the pinion $p$ is disengaged from the motor M and the spring $r$ brings the upper equipment including the contact $C_2$ against a stop not shown. In case of a fault on the line, the currents increase and, if they are sufficient to attract the armature A, the pinion $p$ is engaged with the motor M which turns the pinion in the direction of the arrow with uniform speed. After a time proportional to the angle through which the disk $d$ has turned, the contact $C_2$ meets the contact $C_1$ thus effecting the operation of the circuit interrupter B by completing the circuit of its trip coil T.

Inasmuch as the positioning of the contact $C_1$ is dependent on a function of the ratio of the positive and negative phase sequence components of the voltage, it will be obvious that the angle $\beta$ will be a maximum when there is no negative phase sequence voltage and will decrease as the negative phase sequence voltage increases. In other words, the nearer the fault, the less the displacement of the contact $C_1$ from the contact $C_2$ since the negative phase sequence voltage increases as the fault is approached and, consequently, the shorter the time for the contact $C_2$ to engage the contact $C_1$. The time action of the relay is, therefore, dependent upon the distance between a fault and the relay location.

While I have shown and described my invention in considerable detail, I do not desire to be limited to the exact arrangement shown, but seek to cover in the appended claims all those modifications that fall within the true spirit and scope of my invention.

What I claim as new and desire to secure by Letters Patent of the United States, is,—

1. An electric circuit protective relay including two relatively movable cooperating members, means for positioning one of said members in accordance with a predetermined function of at least two of the phase sequence components of an electric quantity of a circuit to be protected and means for moving the other of said members at a substantially constant speed.

2. An electric circuit protective relay including two independently movable cooperating members, means for positioning one of said members in accordance with a predetermined function of the positive and negative phase sequence components of an electric quantity of a circuit to be protected, and means for moving the other of said members at a substantially constant speed.

3. An electric circuit protective relay including two independently movable cooperating members, means for positioning one of said members in accordance with a predetermined function of the positive and negative phase sequence components of a voltage of a circuit to be protected and means for moving the other of said members at a substantially constant speed.

4. An electric circuit protective relay including two independently movable cooperating contacts, means for positioning one contact in accordance with $$\frac{U_d^2 - U_i^2}{U_d^2},$$

where $U_d$, $U_i$ represent the positive and negative phase sequence components of a voltage of a circuit to be protected and means for moving the other contact.

5. In combination with an electric circuit and a circuit interrupter therefor, means for controlling said circuit interrupter including a relay having two relatively movable cooperating contacts, means for positioning one of said contacts in accordance with a predetermined function of at least two of the phase sequence components of an electric quantity of said circuit and means responsive to an abnormal circuit condition for moving the other contact at substantially constant speed.

6. In combination with an electric circuit, a circuit interrupter therefor, means for controlling said circuit interrupter including a relay having two independently movable cooperating contacts, means for positioning one of said contacts in accordance with a predetermined function of the positive and negative phase sequence components of a voltage of the circuit, means for moving the other contact at a substantially constant speed including a motoring element normally disengaged from said other contact, and means responsive to an abnormal circuit condition for effecting a driving connection between the motoring element and said other contact.

7. An electric circuit protective relay including a movable member, means tending to move said member in one direction in accordance with a phase sequence component of an electric quantity of a circuit to be protected, means tending to move the member in the opposite direction in accordance with another phase sequence component of an electric quantity of the circuit to be protected, said member being constructed and arranged to assume a position dependent on the relative values of said phase sequence components, a cooperating movable member, and means for actuating said cooperating member.

8. A protective relay including two motoring elements respectively connected to be energized in accordance with different phase sequence components of an electric quantity of a circuit to be protected, a disk of electric current conducting material inductively associated with said elements and shaped to assume a position dependent on the relative values of said phase sequence components.

9. In combination with an electric circuit, a relay including an induction disk and electromagnetic means inductively associated with the disk and tending to move the disk in one direction in accordance with a positive phase sequence component of a voltage of the circuit and electromagnetic means inductively associated with the disk tending to move the disk in the opposite direction in accordance with a negative phase sequence component of the voltage of the circuit, the shape of said disk and its position relatively to said electromagnetic means being such that the disk assumes a position dependent upon the relative values of said phase sequence components, a cooperating movable member and means for moving said cooperating member.

10. In combination with an electric circuit, a relay including an induction disk, electromagnetic means inductively associated with the disk and tending to move the disk in one direction in accordance with a positive phase sequence component of a voltage of the circuit and electromagnetic means inductively associated with the disk and tending to move the disk in the opposite direction in accordance with a negative phase sequence component of the voltage of the circuit, the shape of said disk and its position relatively to said electromagnetic means being such that the disk assumes a position dependent upon the relative values of said phase sequence components, a cooperating movable member and means for moving said cooperating member at a substantially constant speed, said means being normally disengaged from said member, and means responsive to an abnormal circuit condition for effecting the engagement of said moving means with said member.

In witness whereof, I have hereunto set my hand this 21 day of June, 1929.

EMILE GRASSOT.